(12) United States Patent
Merchant et al.

(10) Patent No.: US 6,546,010 B1
(45) Date of Patent: Apr. 8, 2003

(54) BANDWIDTH EFFICIENCY IN CASCADED SCHEME

(75) Inventors: Shashank C. Merchant, Sunnyvale, CA (US); Ching Yu, Santa Clara, CA (US); Robert Alan Williams, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/244,430

(22) Filed: Feb. 4, 1999

(51) Int. Cl.[7] .......................... H04L 12/28; H04L 12/56
(52) U.S. Cl. ....................................... 370/389; 370/400
(58) Field of Search ................................. 370/254, 257, 370/258, 351, 389, 395.1, 400, 402, 406, 409, 445, 462, 463

(56) References Cited

U.S. PATENT DOCUMENTS

| | | | | |
|---|---|---|---|---|
| 5,515,376 A | | 5/1996 | Murthy et al. | |
| 6,111,875 A | * | 8/2000 | Kerstein et al. | 370/389 |
| 6,192,028 B1 | * | 2/2001 | Simmons et al. | 370/229 |
| 6,233,244 B1 | * | 5/2001 | Runaldue et al. | 370/412 |
| 6,377,998 B2 | * | 4/2002 | Noll et al. | 709/236 |
| 6,393,457 B1 | * | 5/2002 | Allison et al. | 709/201 |
| 6,400,715 B1 | * | 6/2002 | Beaudoin et al. | 370/392 |
| 6,470,026 B1 | * | 10/2002 | Pearson et al. | 370/463 |
| 6,487,212 B1 | * | 11/2002 | Erimli et al. | 370/413 |

* cited by examiner

*Primary Examiner*—David Vincent

(57) ABSTRACT

Network switch modules are cascaded in a prescribed sequence to support higher port requirements. The network switch modules may circulate a received frame indefinitely if the frame is not destined for any one of the output ports of the cascaded arrangement of network switch modules. Frame forwarding logic within each of the cascaded network switch modules is employed to determine when a network switch module should cease forwarding the received frame. Specifically, the frame forwarding logic takes the frame out of circulation based upon the sequence identifier of the network switch module and an embedded identifier associated with the frame.

12 Claims, 9 Drawing Sheets

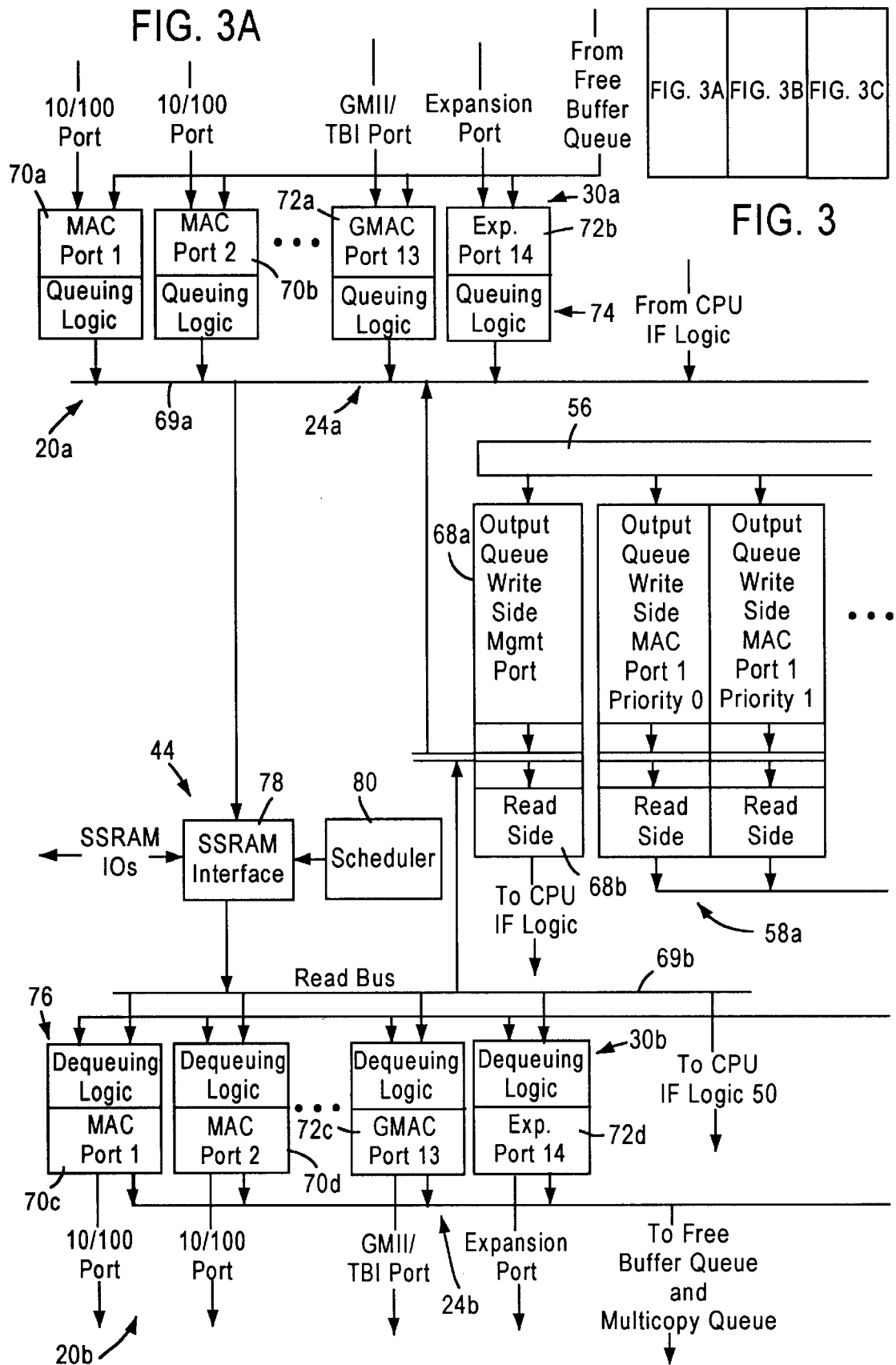

BANDWIDTH EFFICIENCY IN CASCADED SCHEME

BACKGROUND OF THE INVENTION

1. Technical Field

The present invention relates to data communication networking devices, more particularly to an arrangement for forwarding frames in a cascaded scheme.

2. Background Art

Users of networking devices demand flexibility and scalability. To address this need, manufacturers have developed modular architectures that enable cascading of identical networking devices or network switch modules. By cascading these equipment (or components) in a loop, port density can be readily increased without redesign or development of costly interfaces.

A cascaded arrangement is shown in FIG. 4, whereby three network switch modules 101, 103, and 105 are linked so that a received frame may be circulated to the proper output port. With all cascaded loop configurations, a received frame may circulate indefinitely if an appropriate output port cannot be determined among the ports of the three network switch modules 101, 103, and 105. This results in inefficient use of the network switch modules' resources; in particular, the circulating frame reduces the effective bandwidth of the system in that resources consumed by this frame could have been utilized to forward other frames.

It is desirable to minimize the number of "hops" that the frame has to make when removing it from indefinite circulation; i.e., reducing the number of network switch modules that has to process the frame. In one conventional approach, the hop count value is embedded in the frame and is updated by each of the network switch modules as the frame is transferred among them. Also, each network switch module is aware of the total number of network switch modules constituting the loop. When a frame is first received by a network switch module, this originating module writes a hop count value of, for example, 1 into the received frame prior to forwarding it to an adjacent network switch module. Subsequent network switch modules are responsible for incrementing the hop count value as the frame traverses the cascaded loop. At each network switch module, the frame's hop count value is examined to check whether the hop count value has exceeded a threshold value, namely the total number of network switch modules. Once the threshold value is exceeded, the frame is no longer forwarded.

Under this conventional scheme, each of the network switch modules within the cascaded loop is assigned a unique identifier. For example, in FIG. 4, network switch module 101 is assigned a device identification number (DEV_ID) of 5. Similarly, network switch modules 103 and 105 have DEV_IDs of 3 and 6, respectively. These unique identifiers are typically employed both to establish the cascaded loop and to ensure proper forwarding of the frame. Accordingly each network switch module is aware of its predecessor and successor switch modules through their DEV_IDs. For purposes of explanation, it is assumed that device 101 receives a frame that is not destined for any one of its output ports. Module 101 then places a hop count value of 1 in the frame and forwards the frame to an adjacent network switch module 103. If network switch module 103 determines that its output ports are not the proper ports to send the frame, it increments the hop count value of the frame to 2 and forwards the frame to network switch module 105. Now if the frame is not destined for any one of the output ports of this last network switch module 105, then the network switch module 105 increments the hop count value to 3 and loops it back to the originating network switch module 101. At this point, the originating network switch module 101 notes that the hop count value equals the total number of cascaded network switch modules and consequently decides not to forward the frame. In other words, the network switch module 101 recognizes that it should take the frame out of circulation based upon the comparison of the hop count value and the total number of modules.

One major disadvantage with the above approach is that the frame is needlessly transferred back to the originating network switch module, resulting in an additional hop. For example, if "n" number of network switch modules form the cascaded loop, then n number hops are required. Thus, the effective bandwidth of the expansion port is reduced. Moreover, the design complexity is significantly increased because the frame needs to be modified at each network switch module, thereby, requiring additional logic.

SUMMARY OF THE INVENTION

There is a need for an arrangement that efficiently forwards frames in a cascaded scheme, and thereby increases the bandwidth efficiency of the cascade ports. There is also a need to remove a frame from circulation within a cascaded loop without introducing additional design complexity.

These and other needs are attained by the present invention, where a frame forwarding logic selectively forwards a frame based upon an embedded identifier of the frame and a sequence identifier of a network switch module. Under this arrangement, the number of hops is minimized because the frame is not forwarded back to an originating network switch module. Further, the embedded identifier is not altered by subsequent network switch modules in the cascaded loop. Thus, design complexity is not augmented.

According to one aspect of the present invention, a network switching system for transferring a frame comprises a plurality of network switch modules connected in a prescribed cascaded sequence. Each network switch module has a corresponding sequence identifier and frame forwarding logic. The network switch module is configured for selectively forwarding a first frame that is received from a corresponding preceding one of the network switch modules in the prescribed cascaded sequence. The first frame has an embedded identifier, which identifies an initial one of the network switch modules as initiating transmission of the first frame among the network switch modules. The frame forwarding logic selectively forwards the first frame to a corresponding subsequent one of the network switch modules in the prescribed cascaded sequence based on the corresponding sequence identifier and the embedded identifier. An expansion bus is used to successively transmit the first frame from the initial one network switch modules according to the prescribed cascaded sequence. Hence, the number of hops is minimized, thereby, providing an increased in bandwidth efficiency of the cascade ports. Also, under this arrangement, the frame can be selectively passed without having to be modified at each network switch module, which minimizes design complexity.

Still another aspect of the present invention provides a method for transferring a frame among a plurality of network switch modules. The method comprises assigning a sequence identifier to each of the plurality of network switch modules according to a prescribed cascaded sequence. The frame is output from a first of the plurality of network switch modules to a successor one of the plurality of network switch modules. The frame includes an embedded identifier corresponding to the sequence identifier of the first network switch module. The method further includes selectively forwarding the frame in the successor network switch module to another successor one of the network switch modules in the prescribed cascaded sequence, based on the corresponding sequence identifier and the embedded identifier. With this method, the frame can be selectively passed without having to be modified at each network switch module, thereby minimizing design complexity. In addition, other switch modules can be added with minimal modification to existing switch modules.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF ILLUSTRATIVE EMBODIMENTS

The present invention will be described with the example of a switch comprising three network switch modules. The switch operates in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
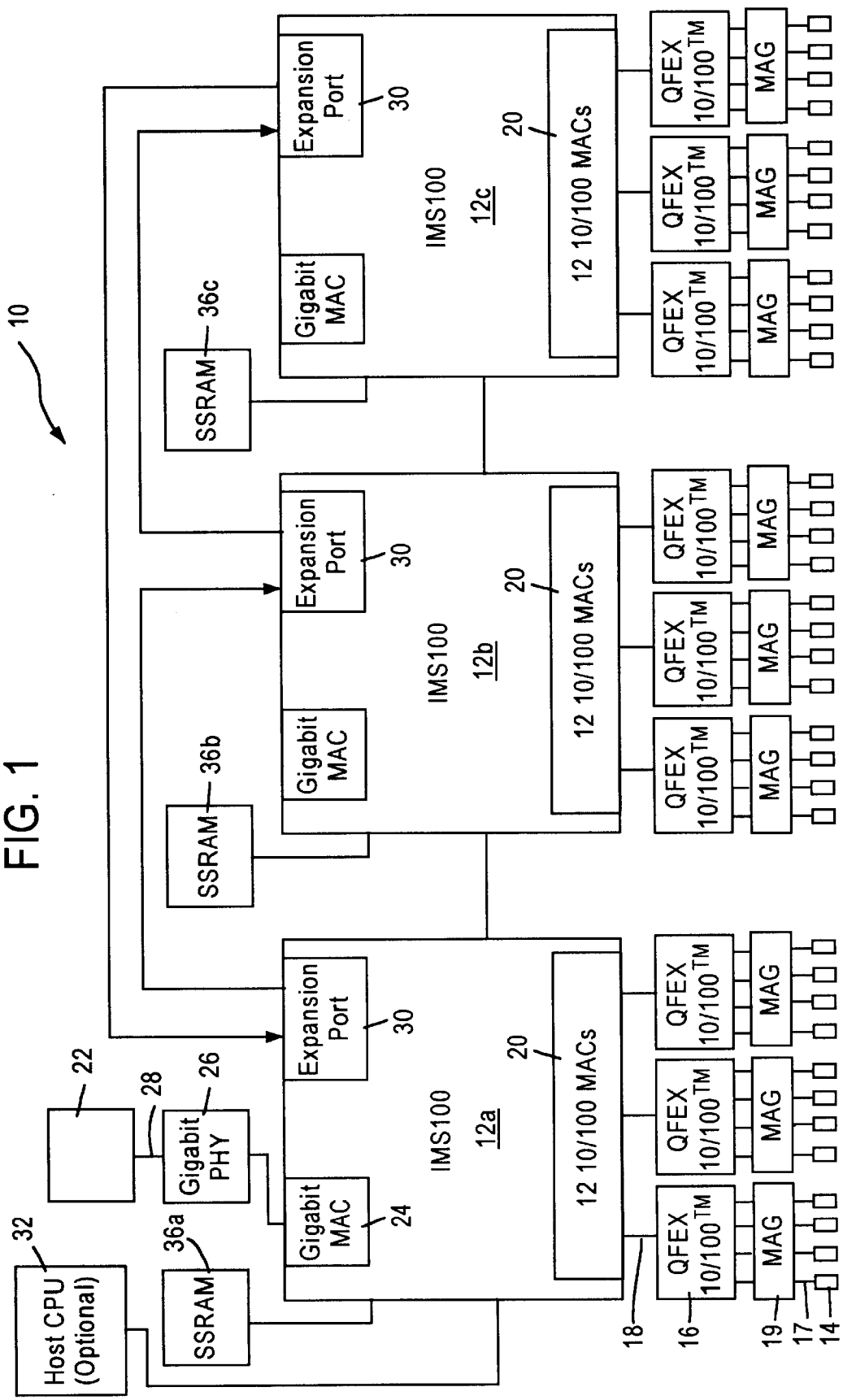
FIG. 1 is a block diagram of a packet switched network including a multiple port switch.

FIG. 1 is a block diagram of an exemplary system in which the present invention may be advantageously employed. The exemplary system 10 is a packet switched network, such as an Ethernet (IEEE 802.3) network. The packet switched network includes integrated multiport switch (IMS) 12 that enable communication of data packets between network stations. The term multiport switch and network switch module are used interchangeably. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the network switch modules (or multiport switches) 12 selectively forward data packets received from the network nodes 14 or 22 to the appropriate destination based upon Ethernet protocol.

Each network switch module 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each network switch module 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding network switch module 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding network switch module 12.

Each network switch module 12 is coupled to 10/100 physical layer (PHY) transceivers 16 configured for sending and receiving data packets to and from the corresponding network switch module 12 across a corresponding shared media independent interface (MII) 18. In particular, each 10/100 PHY transceiver 16 is configured for sending and receiving data packets between the network switch module 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each network switch module 12 also includes an expansion port 30 for transferring data between other switches according to a prescribed protocol. For example, each expansion port 30 can be implemented as a second gigabit MAC port similar to port 24, thereby enabling multiple network switch modules 12 to be cascaded together as a separate backbone network.

Figure 2:
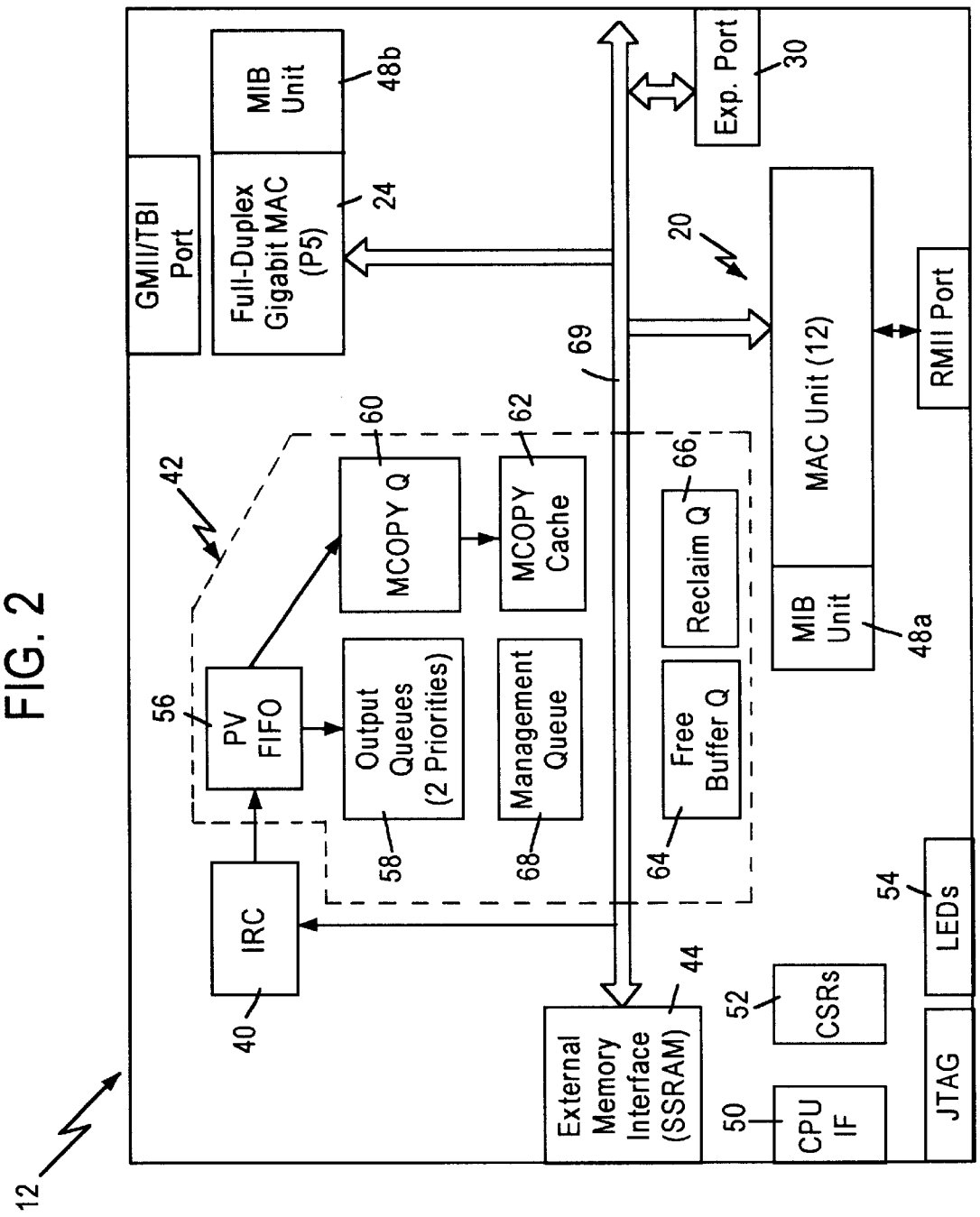
FIG. 2 is a block diagram of the multiple port switch of FIG. 1.

FIG. 2 is a block diagram of the network switch module 12. The network switch module 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit mode 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the network switch module 12. In particular, the network switch module 12 uses the external memory 36 for storage of received frame data, memory structures, and MIB counter information. The external memory 36 is preferably either a Joint Electron Device Engineering Council (JEDEC) pipelined burst or Zero Bus Turnaround™ (ZBT)-SSRAM having a 64-bit wide data path and a 16-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The network switch module 12 also includes a processing interface 50 that enables an external management entity such as a host CPU 32 to control overall operations of the network switch module 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The network switch module 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data frame may include a VLAN (virtual LAN) tagged frame according to IEEE 802.1d protocol that specifies another network (e.g., via a gateway such as the gigabit mode 22) or a prescribed group of stations. The IRC 40 may also determine that the received data packet should be transferred to another network switch module 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the port vector is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
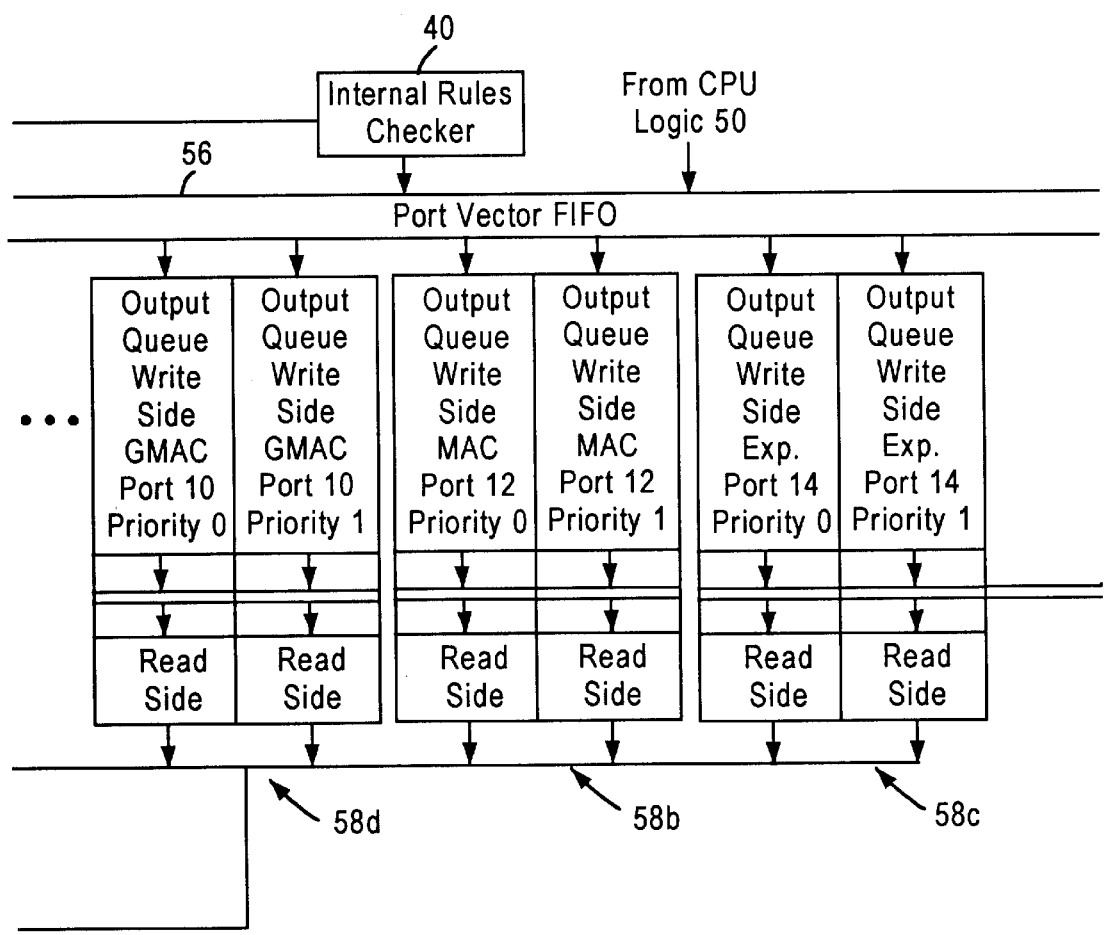
FIG. 3 is a block diagram illustrating in detail the switching subsystem of FIG. 2.
Figure 3C:
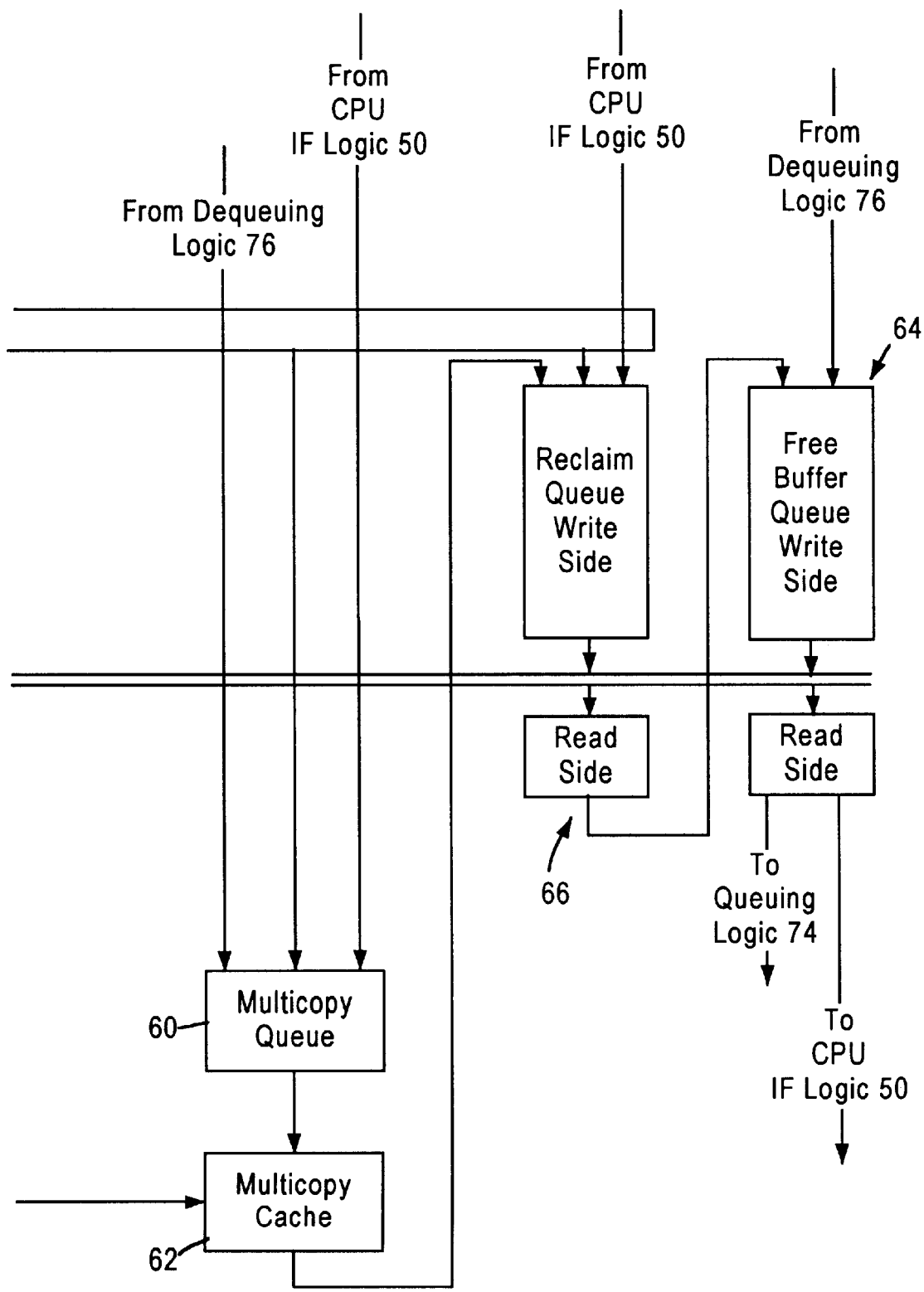
Figure 4:
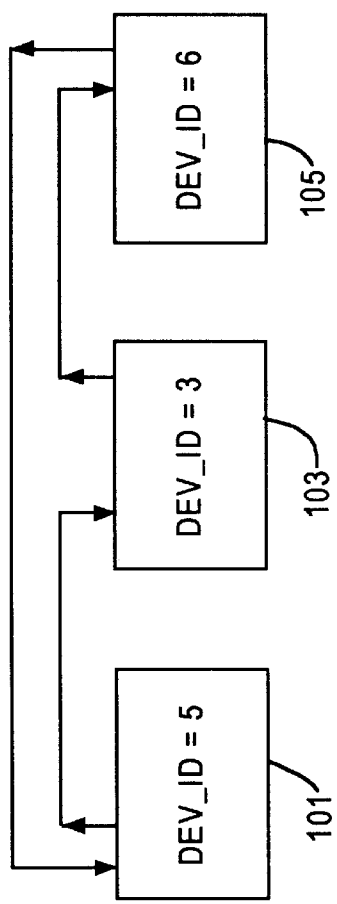
FIG. 4 is a block diagram of a cascaded sequence of the network switch modules using a conventional device numbering scheme.

FIG. 3 depicts the switch subsystem 42 of FIG. 2 in more detail according to an exemplary embodiment of the present invention. Other elements of the network switch module 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include four (4) quad-MAC enhanced (QMACE) modules (only two of each shown and referenced by numerals 70a, 70b, 70c, and 70d) configured for performing the corresponding receive or transmit function for four (4) switch ports according to IEEE 802.3 protocol. Hence, QMACE module 70a performs receive MAC operations for 10/100 Mb/s switch ports 0, 1, 2, 3; module 70b performs receive MAC operations for 10/100 Mb/s switch ports 4, 5, 6, 7; etc. The QMACE modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the network switch module 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a data frame in an internal FIFO upon reception from the corresponding switch port. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). The frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the output queues 58 or the management queue 68, should receive the associated frame pointer. The port vector FIFO 56 places the frame pointer into the top of the appropriate queue 58 and/or 68. This queues the transmission of the frame. Each output queue 58 is processed separately by the host CPU 32 via the CPU interface 50.

As shown in FIG. 3, each of the transmit MAC units 70c, 70d, 72d, and 72c has an associated output queue 58a, 58b, 58c, and 58d, respectively. Although not shown in FIG. 3, in preferred embodiments each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read during the assigned slot. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the network switch module 12 will now be provided.

Cascading Capability

Figure 5:
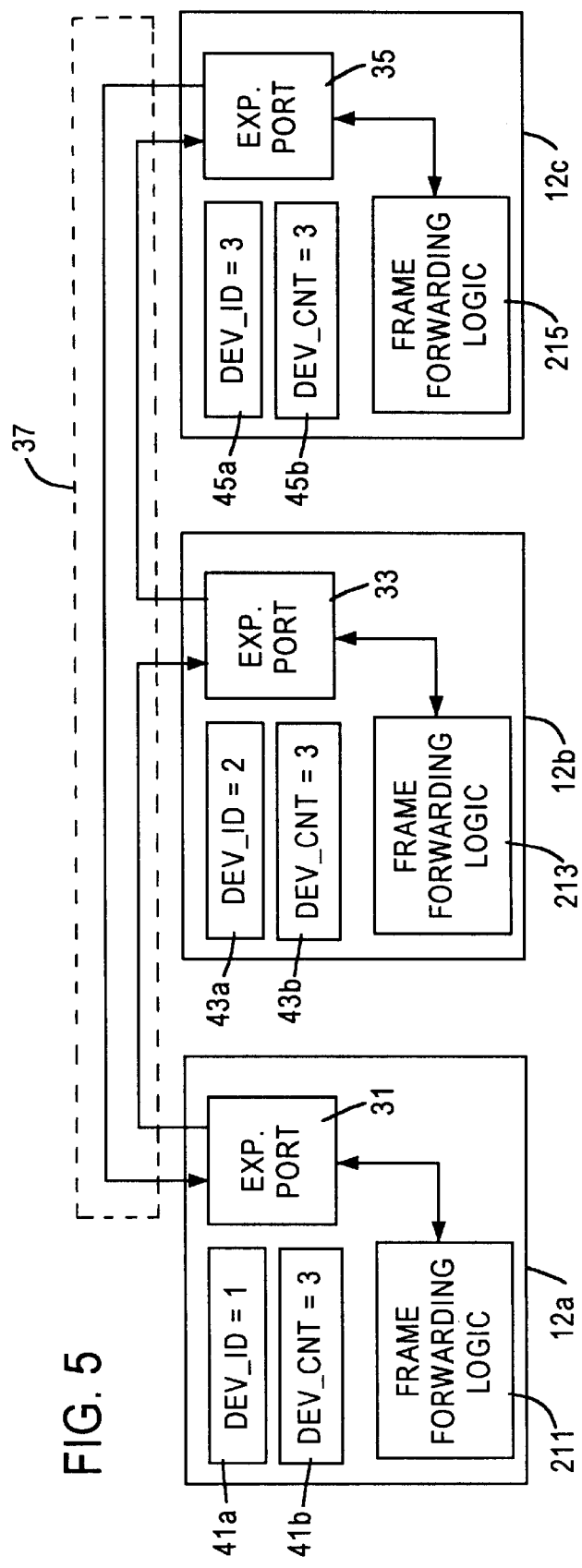
FIG. 5 is a block diagram of a cascaded sequence of the network switch modules utilizing a total device count value in accord with an embodiment of the present invention.

FIG. 5 is a simplified diagram illustrating an exemplary arrangement for selectively forwarding a received frame according to an embodiment of the present invention. In general, all network switch modules within a prescribed cascaded sequence are assigned a unique device identifier (DEV_ID) (i.e., sequence identifier) so that these DEV_IDs follow a numeric sequence around the cascaded loop. The sequence may be in ascending or descending order. As shown in FIG. 2, three network switch modules 12a, 12b, and 12c exist and are assigned unique sequence identifiers (DEV_IDs). The sequence identifier of network switch module 12a is 1. The next switch module 12b in the cascaded sequence has a sequence identifier of 2. Switch module 12c has a sequence identifier of 3. In an exemplary embodiment, the device identifier is a four-octet field and is stored in an internal register with each of the network switch modules. These internal registers are initialized and maintained by the host CPU 32. For network switch module 12a, the sequence identifier (DEV_ID=1) is stored in register 41a. Further, network switch module 12a has a frame forwarding logic 211 coupled to an expansion port 31, which enables the forwarding of frames to other members in the cascaded loop. Similarly, network switch module 12b has internal register 43a for storing its sequence identifier (DEV_ID=2), as well as frame forwarding logic 213 and expansion port 33. As for the last switch 12c in the cascaded sequence, it includes an internal register 45a to store its sequence identifier (DEV_ID=3), frame forwarding logic 215, and an expansion port 35.

Physical connectivity of the cascaded loop is accomplished via the expansion (or cascade) ports 31, 33, and 35. The physical connection can be thought of as constituting an expansion bus 37, which permits the transfer of frames among the cascaded network switch modules 12a, 12b, and 12c. The present invention improves the effective bandwidth of this expansion bus by eliminating unnecessary traffic. This improvement is made clear in the discussion to follow.

The frame forwarding logic, in one exemplary embodiment, may reside within the IRC 40 of FIG. 2. As shown in the figure, each network switch module has knowledge of the number of cascaded network switch modules, denoted by a device count value (DEV_CNT) stored in an internal register, which is the total number of network switch modules within the cascaded loop. Like the internal registers that store the sequence identifiers, these internal registers are controlled by the host CPU 32. In network switch module 12a, this count value is stored in internal register 41b. Network switch module 12b stores the DEV_CNT value in internal register 43b. Likewise, network switch module 12c has an internal register 45b to store the total count value. The frame forwarding logic (e.g., 211, 213, and 215) utilizes the DEV_CNT value to determine whether to forward or remove the frame from circulation. The operation of the frame forwarding logic is explained with respect to FIG. 6.

Figure 6:
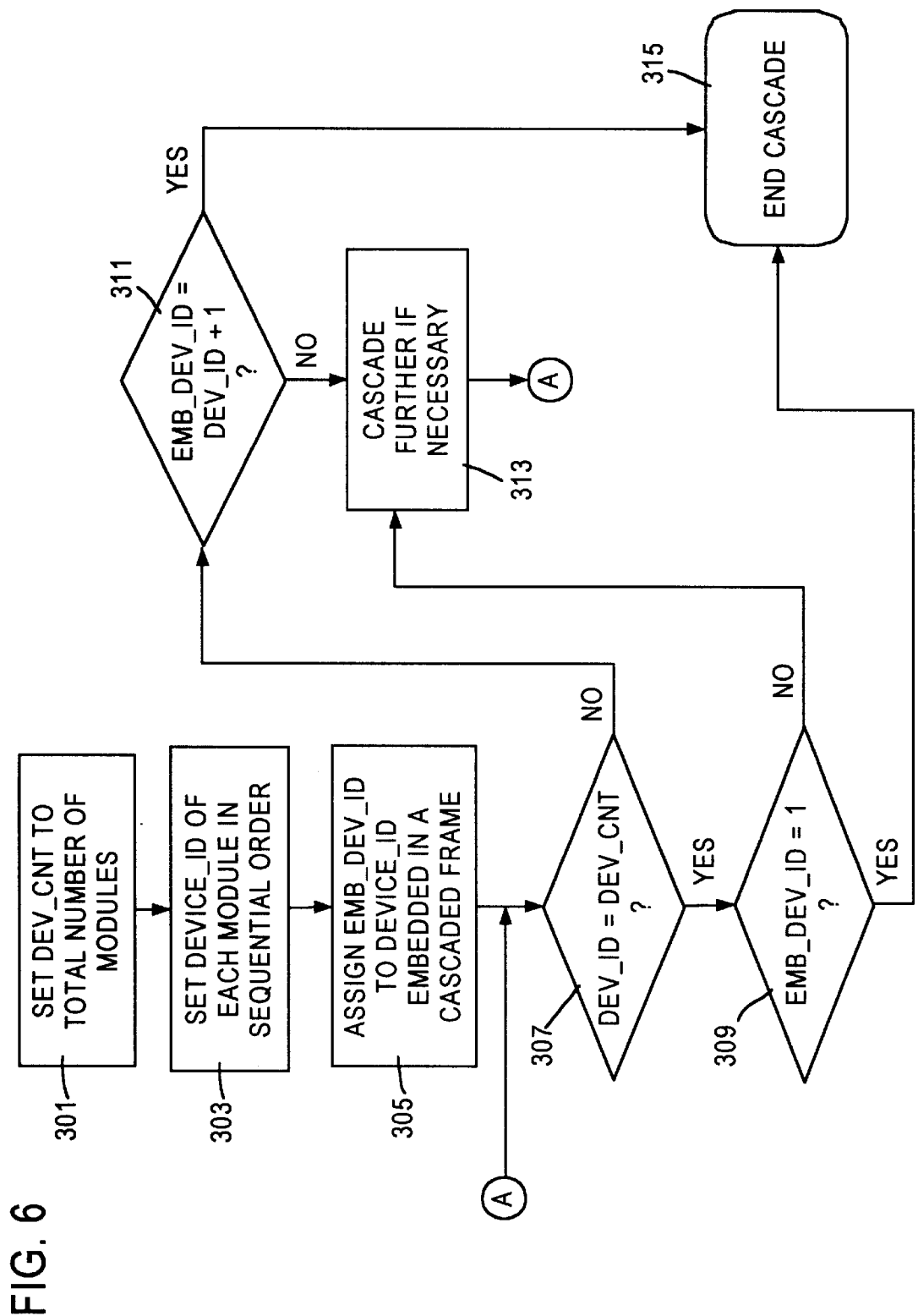
FIG. 6 is flow diagram showing the operation of frame forwarding logic of FIG. 5 according to an embodiment of the present invention.

FIG. 6 shows a diagram of the operational flow in accord with an embodiment of the present invention. The first step 301 is to initialize the DEV_CNT values associated with each network switch module 12a, 12b, and 12c. In this case, DEV_CNT is set to 3 by host CPU 32. In addition, the DEV_ID of each of the modules 12a, 12b, and 12c is initialized by host CPU 32 in a sequential numeric order, for example, of 1, 2, and 3, respectively in step 303. In an exemplary scenario, a frame is received by network switch module 12a from a network switch port 20 or 24, and determines whether the frame should be output from the corresponding expansion port 31. In turn, the frame forwarding logic 211 inserts an embedded device identifier (EMB_DEV_ID) into the frame (step 305). The frame now possesses an EMB_DEV_ID of 1, signifying that network switch module 12a with DEV_ID of 1 is the originator of the frame in the cascaded loop. If the frame is not destined for any one of the output ports (not shown) of network switch module 12a, then the frame is forwarded by the frame forwarding logic 211. The expansion port 31 outputs the frame to the expansion bus 37 to the next network switch module in the prescribed cascaded sequence; namely, switch 12b.

The forwarded frame is received by network switch module 12b via its expansion port 33. Per step 307 the frame forwarding logic 213 checks whether the DEV_ID of network switch module 12b equals the DEV_CNT. In this case, the DEV_ID is 2 while the DEV_CNT is 3; thus, step 311 is executed. Step 311 checks whether the EMB_DEV_ID of the frame equals the DEV_ID of the next network switch module 12c (i.e., DEV_ID+1). In this example, EMB_DEV_ID is 1, which does not equal DEV_ID+1 (i.e., 3). Consequently, the frame is forwarded to the adjacent network switch module 12c, which has a DEV_ID of 3 per step 313. Specifically, the frame is cascaded further by frame forwarding logic 213 via expansion port 33, which outputs the frame to the expansion port 35 of network switch module 12c. The alternative to the decision step 307 is to determine whether the EMB_DEV_ID is 1 (step 309), bearing in mind that this step is reached only when the DEV_ID equals the DEV_CNT (which is not the case in this instance). Continuing with the example, step 307 is performed again with respect to network switch module 12c.

The frame forwarding logic 215 of network switch module 12c determines, per step 307, whether the DEV_ID equals to DEV_CNT. Because the frame has not reached the end of the cascade, step 311 is executed. The frame forwarding logic 213 checks in step 311 whether the EMB_DEV_ID of 1 equals the next DEV_ID (3)—which is not true. Thus, the frame is forwarded to the next network switch module 12c in step 313. At this point, the frame forwarding logic 215 of network switch module 12c determines in step 307 that the DEV_ID of network switch module 12c (DEV_ID=3) equals the DEV_CNT. As a result, step 309 is performed. Because EMB_DEV_ID is equal to 1, the frame is not forwarded (step 315). By not forwarding the frame back to the original network switch module 12a, the expansion bus does not experience traffic from this frame. This translates into system efficiency with respect to data transfer.

Assume now that the frame is initially received by network switch module 12c, which has been assigned a DEV_ID of 3. Under this scenario, the frame also has an EMB_DEV_ID of 3. If the frame does not have a destination address that maps to any of the output ports of network switch module 12c, then the frame is forwarded to the next network switch module in the cascaded loop. That is, because the next switch in sequence is network switch module 12a, it receives the frame via its expansion port 31. The frame forwarding logic 211 of network switch module 12a in step 307 then inquires whether its sequence identifier (DEV_ID=1) equals the DEV_CNT (3). Since the answer is in the negative, step 311 is performed. Because EMB_DEV_ID is not equal to DEV_ID+1, the frame is sent to the next network switch module 12b per step 313. The frame is output from expansion port 31 to the expansion bus 37 and arrives at expansion port 33 of the next switch 12b.

The frame forwarding logic 213 of network switch module 12b checks whether the DEV_ID of 2 equals the DEV_CNT of 3 in step 307. Accordingly, step 311 is executed next. This step 311 asks whether the EMB_DEV_ID (3) equals to DEV_ID+1 (3). Because the EMB_DEV_ID of the frame is identical to the DEV_ID of the next switch 12c, the frame forwarding logic 213 ceases circulating the frame. It is important to note that throughout the manipulation of the received frame, the embedded device identifier of the frame is never altered by subsequent network switch modules. This contrasts with the conventional approach of updating the hop count value of the frame at each network switch module, which introduces additional complexity into the design. The present invention advantageously eliminates the need to employ more complex logic or circuitry within each network switch module.

Figure 7:
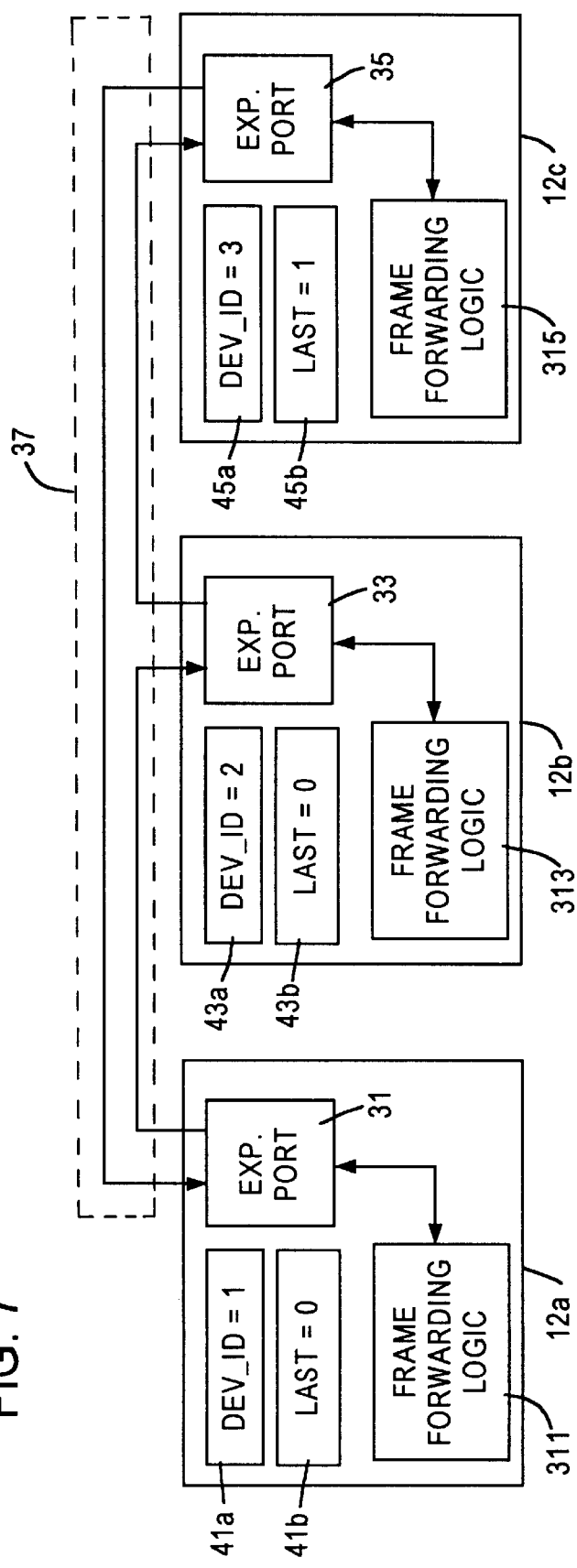
FIG. 7 is a block diagram of a cascaded sequence of the network switch modules utilizing a last device indicator in accord with an embodiment of the present invention.

FIG. 7 illustrates another embodiment of the present invention in which a last device indicator (LAST) value is utilized instead of a DEV_CNT value. As shown in the figure, three network switch modules 12a, 12b, and 12c exist and are assigned unique sequence identifiers (DEV_IDs). The sequence identifier of network switch module 12a is 1. The next switch module 12b in the cascaded sequence has a sequence identifier of 2. Switch module 12c has a sequence identifier of 3. In an exemplary embodiment, the device identifier is a four-octet field and is stored in an internal register within each of the network switch modules as in the previous arrangement of FIG. 5. These internal registers are initialized and maintained by the host CPU 32. For network switch module 12a, the sequence identifier (DEV_ID=1) is stored in register 41a. Further, network switch module 12a has a frame forwarding logic 311 coupled to an expansion port 31, which enables the forwarding of frames to other members in the cascaded loop. Similarly, network switch module 12b has internal register 43a for storing its sequence identifier (DEV_ID=2), as well as frame forwarding logic 313 and expansion port 33. As for the last switch 12c in the cascaded sequence, it includes an internal register 45a to store its sequence identifier (DEV_ID=3), frame forwarding logic 315, and an expansion port 35. As in FIG. 5, the network switch modules 12a, 12b, and 12c are arranged in a cascaded loop through the connection of their respective expansion ports 31, 33, and 35.

In this embodiment, the total number of network switch module is not need. Instead, each network switch module maintains a LAST indicator via its designated internal register (e.g., 41b, 43b, and 45b). If the network switch module is not the "last" device in the cascaded sequence, a 0 is assigned by the host CPU 32. For example, the network switch modules 12a and 12b are not "last" in the cascaded sequence; accordingly, the registers 41b and 43b store zeros for the LAST indicator values. Network switch module 12c, however, is the last in the sequence and is assigned a 1 for its LAST indicator. As a subsequent module is added to the loop, the LAST indicators of existing modules are set to 0 while the newly added module would have a LAST indicator of 1.

Figure 8:
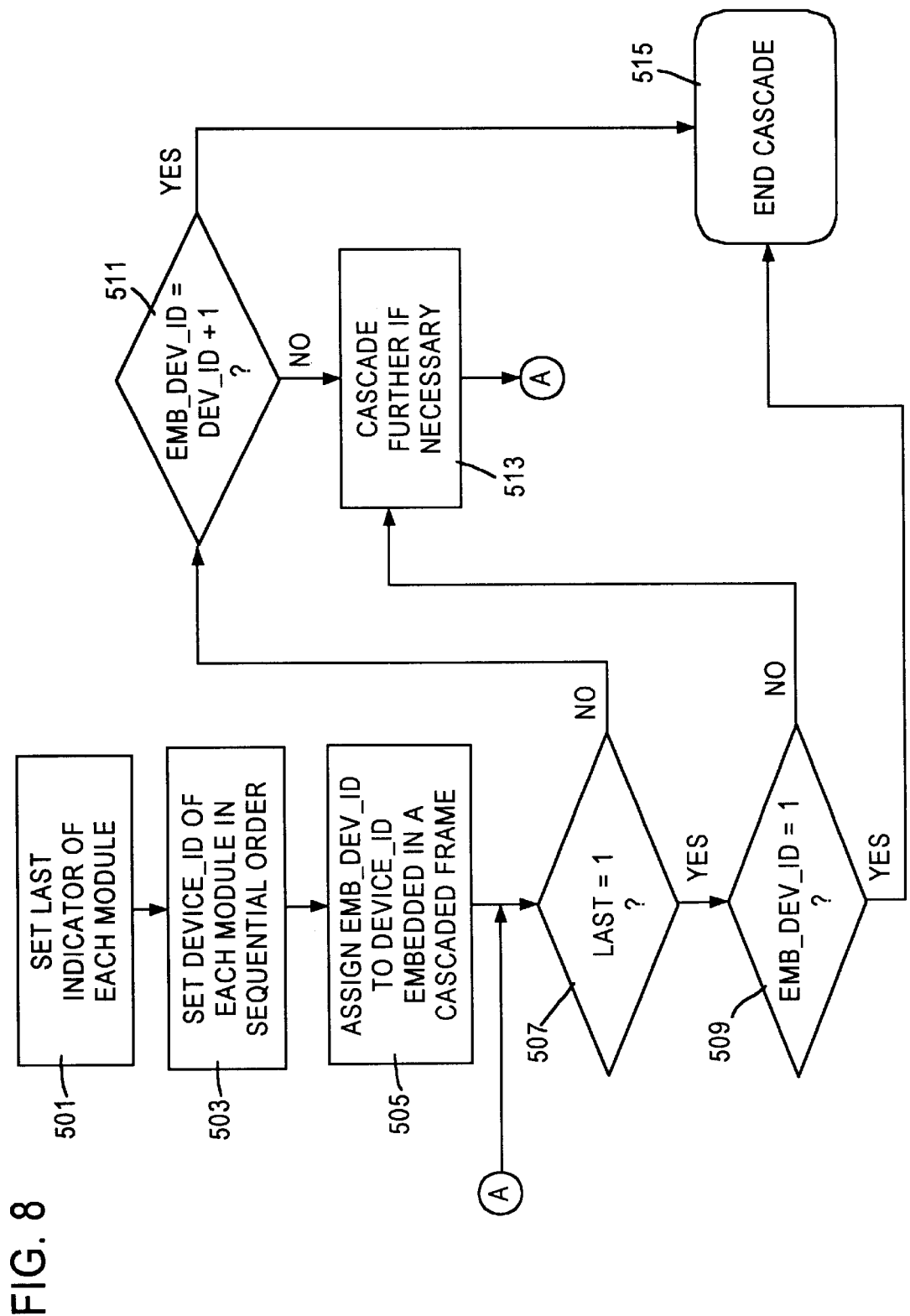
FIG. 8 is flow diagram showing the operation of frame forwarding logic of FIG. 7 according to an embodiment of the present invention.

FIG. 8 is a diagram of the operation of the frame forwarding logic 311, 313, and 315 in accord with an embodiment of the present invention. Steps 501 entails the host CPU 32 setting the LAST indicators of the network switch modules 12a, 12b, and 12c. This initialization of the LAST indicators may be performed at power-up of the system 10 or during system reset, for example. In this instance, network switch modules 12a and 12b have LAST indicators assigned to 0 by the host CPU 32, while network switch module 12c has a LAST indicator value of 1. In the next step 503, the DEV_IDs of these modules are assigned sequentially by the host CPU 32 as 1, 2, and 3 corresponding respectively to network switch modules 12a, 12b, and 12c. Next, the EMB_DEV_ID of the frame is set by the frame forwarding logic (e.g., 311, 313, and 315) to the DEV_ID of the network switch module that first receives (or originates) the frame (step 505). Alternatively, the EMB_DEV_ID may be inserted by the expansion ports 31, 33, and 35.

As with FIG. 3, for purposes of explanation, the frame is assumed to have been received by network switch module 12a from a external station (not shown). Accordingly, frame forwarding logic 311 in step 505 inserts an EMB_DEV_ID of 1 corresponding to its DEV_ID (1) into the received frame. The originating switch 12a then determines via its frame forwarding logic 311 that the frame is not destined to any one of its output ports (not shown). In turn, the frame forwarding logic 311 outputs the frame via the expansion port 31 onto the expansion bus 37. The next switch in the sequence is network switch module 12b. The frame forwarding logic 313 of network switch module 12b in step 507 checks whether the LAST indicator is 1 (i.e., whether the network switch module 12b is the last one in the cascaded sequence). Because the network switch module 12b has its LAST indicator equal to 0, step 511 is performed next. This step inquires whether the EMB_DEV_ID of 1 equals the DEV_ID of the successor network switch module 12b (i.e., DEV_ID+1). Since the LAST indicator of network switch module 12b is 0, the frame forwarding logic 213 of network switch module 12b executes steps 507 and 511, resulting in the forwarding of the frame to network switch module 12c. The frame forwarding logic 215 notes that the LAST indicator of network switch module 12c is equal to 1. Consequently, the frame forwarding logic 215 determines if the EMB_DEV_ID is 1; in this case, the EMB_DEV_ID is in fact 1. Therefore, the frame forwarding logic 215 does not forward the frame (step 515). By using the LAST indicator, the frame forwarding logic within each of the network switch module possess the functional capability to remove the received frame from circulation around the cascaded loop.

According to the disclosed embodiments, the frame forwarding logic resident within the network switch modules provides the capability to selectively forward a frame. By examining an embedded identifier of the frame and the sequence identifier of the network switch module, the frame forwarding logic regulates the circulation of the frame within the cascaded loop formed by the network switch modules. Under this approach, the frame is prevented from circulating back to the originating network switch module, resulting in an increase in system bandwidth.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A network switching system for transferring a frame, the system comprising:
    a plurality of network switch modules connected in a prescribed cascaded sequence, each switch module having:
    (1) a corresponding sequence identifier, and
    (2) frame forwarding logic configured for selectively forwarding a first frame, received from a corresponding preceding one of the network switch modules in the prescribed cascaded sequence, the first frame having an embedded identifier identifying an initial one of the network switch modules as initiating transmission of the first frame among the network switch modules, the frame forwarding logic selectively forwarding the first frame, to a corresponding subsequent one of the network switch modules in the prescribed cascaded sequence, based on the corresponding sequence identifier and the embedded identifier; and
    an expansion bus for successively transmitting the first frame from the initial one network switch modules according to the prescribed cascaded sequence.

2. The network switching system as in claim 1, wherein the sequence identifiers are in a sequential numeric order.

3. The network switching system as in claim 1, wherein each of the network switch module has a total device count value corresponding to a total number of the plurality of network switch modules, and the frame forwarding logic selectively forwarding the first frame based upon a comparison between the total device count value and the embedded identifier.

4. The network switching system as in claim 1, wherein each of the network switch module has a last device indicator, the last device indicator being set based upon a corresponding position of the network switch module within the prescribed cascaded sequence, the frame forwarding logic performing a selected comparison between the corresponding sequence identifier and the embedded identifier based on the last device indicator.

5. A method for transferring a frame among a plurality of network switch modules, the method comprising:
    assigning a sequence identifier to each of the plurality of network switch modules according to a prescribed cascaded sequence;
    outputting the frame from a first of the plurality of network switch modules to a successor one of the plurality of network switch modules, the frame including an embedded identifier corresponding to the sequence identifier of the first network switch module; and
    selectively forwarding the frame in the successor network switch module to another successor one of the network switch modules in the prescribed cascaded sequence, based on the corresponding sequence identifier and the embedded identifier.

6. The method as in claim 5, wherein the assigning step includes assigning the sequence identifiers in a sequential numeric order.

7. The method as in claim 5, wherein the assigning step includes assigning a total device count value corresponding to a total number of the plurality of network switch modules, and the selectively forwarding step includes forwarding the first frame based upon a comparison between the total device count value and the embedded identifier.

8. The method as in claim 7, wherein the step of selectively forwarding comprises:
    first determining whether the sequence identifier is identical to the device count value;
    second determining according to the first determining step whether the embedded identifier equals the sequence identifier of the first network switch module or whether the embedded identifier equals a sequence identifier of the successor network switch module; and
    selectively holding the frame based upon the first and second determining steps.

9. The method as in claim 5, wherein the assigning step includes assigning a last device indicator being set based upon a corresponding position of the network switch module within the prescribed cascaded sequence, and the selectively forwarding step includes performing a selected comparison between the corresponding sequence identifier and the embedded identifier based on the last device indicator.

10. The method as in claim 9, wherein the step of selectively forwarding comprises:
    first determining whether the last device indicator indicates that the network switch module is positioned in a last position along the prescribed cascade sequence;
    second determining according to the first determining step whether the embedded identifier equals the sequence identifier of the first network switch module or whether the embedded identifier equals a sequence identifier of the successor network switch module; and
    holding the frame based upon the first and second determining steps.

11. The method as in claim 5, wherein the step of selectively forwarding is performed by a frame forwarding logic.

12. The method as in claim 5, wherein the step of outputting is over an expansion bus.

* * * * *